Patented Feb. 4, 1941

UNITED STATES PATENT OFFICE 2,230,978

CONVERSION OF HYDROCARBONS

Edwin T. Layng, Jersey City, N. J., assignor to The Polymerization Process Corporation, Jersey City, N. J., a corporation of Delaware No Drawing. Application June 1, 1939, Serial No. 276,811

7 Claims. (Cl. 196—10)

This invention relates to the polymerization of olefins to higher boiling hydrocarbons. More particularly, the invention relates to the conversion of normally gaseous olefins, particularly propylene and butylenes, to polymers within the gasoline boiling range. Still more particularly, the invention relates to a process for the treatment of such gaseous olefins by contact thereof at elevated conditions of temperature and pressure with a catalytic contact agent comprising as an essential ingredient a metal pyrophosphate.

Certain pyrophosphates including those of copper, zinc, magnesium, iron, aluminum and cobalt are capable of promoting the polymerization of olefins but it has been found necessary to pass the hydrocarbons under treatment over the catalytic material containing the pyrophosphate for some time at elevated temperature in order to initiate the conversion of olefins to polymer products. Apparently the pyrophosphate is activated by the production therein of a modification containing active centers for accelerating polymerization of olefins. The active modification of the pyrophosphate probably is formed by reduction. The length of time and the temperature necessary for this activation period depends somewhat upon the method by which the pyrophosphate is produced. If, in the production of certain metal pyrophosphates by reaction of a soluble pyrophosphate, such as sodium pyrophosphate, and a soluble metal salt, an excess of the pyrophosphate is employed, it is found that the resulting product is stabilized against reduction to the active modification. Probably this results from the formation of a double salt, of sodium pyrophosphate and the metal pyrophosphate, which acts as a reduction inhibitor. Under these conditions it is necessary, in order to activate the catalyst, to subject the catalytic mass to temperatures during the activation period which may be substantially higher than those desired for the polymerization reaction. For example, it may be desired to carry out the polymerization reaction at a temperature of 350° F., while it may be necessary to pass the hydrocarbon mixture under treatment over the catalytic mass at a temperature of 450° to 500° F. in order to initiate the conversion of olefins. When a copper pyrophosphate contact agent is prepared utilizing sodium pyrophosphate in an amount which is 10 per cent in excess of the amount equivalent to copper sulfate according to the reaction.

the presence of the double salt of copper pyrophosphate and sodium pyrophosphate which is contained in the resulting product necessitates passing the olefinic mixture under treatment over the contact agent for a period of as much as fifty hours while raising the temperature to 500° F. in order to initiate conversion of the olefins to polymer products. Thereafter the desired lower operating temperature may be employed.

It is believed that during the active life of a contact agent reduction is continuous with the gradual production of the active material. The reduction products formed originally appear to act as nuclei which promote the reduction of additional material. For example, the reduction products formed at the high activating temperature mentioned above act to promote the reduction of additional material at the lower operating temperature since it is found that no loss of conversion rate results from reduction of the temperature from the high activating temperature to the lower polymerizing temperature. It should be understood, however, that the invention is not to be limited by any theory regarding the mechanism of activation of the pyrophosphate.

If an excess of the sodium pyrophosphate is avoided in the preparation of the catalytic material whereby it does not contain the double salt, it is found that the activation period necessary is shortened, and it may not be necessary to raise the temperature during the activation period substantially above the desired polymerization reaction temperature.

However, it may be desirable to form the double salt in the metal pyrophosphate when the latter is to be used under certain conditions of operation since, in its absence, the catalytic material may under some circumstances reduce more rapidly to the active modification than required for the continuance of the polymerizing reaction at a steady rate. Under these conditions the contact agent soon loses its mechanical form and exhibits a relatively short active life. As an example of the use of catalytic material containing the stabilizer, or reduction inhibitor, it may be desired to operate at high temperatures on a gaseous feed of low olefin content or one containing refractory olefins such as ethylene and propylene. Under these conditions a highly stabilized catalytic material is desirable since the reduction conditions are quite severe and might otherwise cause the material to become reduced too rapidly for continuance of the polymerizing reaction at a steady rate.

The initiation of the polymerizing activity of the metal pyrophosphate by the passage thereover of the olefinic gas under treatment results in undesirable waste of gases containing substantial proportions of convertible constituents during the activation period, whether the pyrophosphate is stabilized or unstabilized. Furthermore, the employment of temperatures higher than the reaction temperature during the activation period, if necessary, requires periodically raising the temperature to which the reaction gases are heated above the temperature to which they are normally heated for the polymerization reaction. This necessitates the provision of heating capacity for the reaction gases in excess of that normally required for the reaction and in addition results in uneven operation.

In connection with the present invention it has been found that the use of the olefin-rich fresh feed gases for activating the catalytic material can be avoided and that activation can be effected prior to the conversion operation by subjecting the catalytic material at elevated temperature to reducing conditions for a period of time sufficient to effect reduction of a portion of the metal pyrophosphate employed to the active modification thereof. It is convenient to effect the activation of the catalytic material in this manner after the material has been charged to the reactor in which conversion is to be carried out by the maintenance therein of an atmosphere of hydrogen or the maintenance therein of a mixture of hydrogen and other reducing or non-oxidizing gases. For purposes of discussion the atmosphere which is employed will be referred to as hydrogen, but it is to be understood that the invention is not limited in scope in this manner but contemplates the use of any suitable fluid medium, other than olefin-rich mixtures suitable for conversion treatment, for maintaining the desired reducing atmosphere.

The hydrogen may be circulated through the reactor at the desired operating conditions, or the hydrogen atmosphere may be maintained at the desired operating temperature and pressure in the reactor by other means without circulation. Any suitable temperature may be employed but it is found that temperatures in the range of 300° to 500° F. are advantageous. In general the lower temperatures in this range are to be preferred, but when operating at these lower temperatures it is advantageous to maintain a superatmospheric pressure. For example, a temperature of 500° F. at atmospheric pressure is satisfactory or a temperature of 300° F. at a pressure of 1000 pounds per square inch may be used with equally good results.

The operation of the invention and the advantages thereof are further explained and illustrated below by reference to specific examples of the use of a catalytic material consisting essentially of copper pyrophosphate for the conversion of gaseous mixtures containing substantial proportions of olefins. It is to be understood, however, that the invention is not limited in scope by reference to these specific operations but contemplates as well the use of catalytic material comprising other metal pyrophosphates capable of reduction to an active modification which is a polymerization catalyst, such as the pyrophosphates of zinc, magnesium, iron, aluminum and cobalt, and contemplates furthermore the use of such catalytic material to promote polymerization of normally liquid olefins to higher boiling products as well as the polymerization of normally gaseous olefins as illustrated.

In Tables A, B and C below there are recorded the results of the use of a copper pyrophosphate catalytic material to promote polymerization of olefins contained in a gaseous mixture including substantial proportions of olefins.

The copper pyrophosphate employed was made by reacting a 0.2 molar solution of sodium pyrophosphate and a 0.2 molar solution of copper sulfate to obtain a copper pyrophosphate precipitate, the sodium pyrophosphate being used in an amount which is 10 per cent in excess of the amount equivalent to the copper sulfate according to the reaction set forth above. The copper pyrophosphate precipitate, after washing and drying, was formed into one-eighth inch pellets for use as a contact agent. In each of the operations represented by the data of Tables A, B and C a gaseous hydrocarbon feed containing 40 to 42% of butylenes (of which about one-third was iso-butylene) was passed through the reactor under a pressure of 1400 pounds per square inch at the temperatures indicated in each table and at a rate expressed in the tables as cubic feet per hour (measured as standard conditions of temperature and pressure) per pound of catalytic material. In the operation represented by Table A the feed gases were passed through the reactor at the temperatures indicated without the preliminary treatment of the catalytic material with hydrogen in accordance with the present invention. In the operations represented by Tables B and C hydrogen was passed over the catalyst for a period of 10 hours under suitable temperature and pressure conditions which were, in the case of Table B, 300° F. and 1000 pounds per square inch and in the case of Table C, 500° F. and atmospheric pressure. Thereafter the temperature was brought to the indicated operating temperature and the flow of feed gases through the reactor was initiated.

Table A

| Period No. | Hours | Feed rate | Mid-reactor temp., °F. | Weight percent liquid in product |
| --- | --- | --- | --- | --- |
| 1 | 6 | 20.4 | 100–300 | |
| 2 | 8 | 19.4 | 300–350 | |
| 3 | 8 | 20.0 | 350–375 | |
| 4 | 8 | 19.7 | 375–425 | |
| 5 | 8 | 20.7 | 425–450 | |
| 6 | 8 | 20.3 | 450–500 | 1.7 |
| 7 | 8 | 18.7 | 500–395 | 20.9 |
| 8 | 8 | 19.2 | 395–350 | 18.7 |
| 9 | 8 | 19.4 | 350 | 17.6 |
| 10 | 8 | 17.8 | 350–375 | 17.9 |

Table B

| Period No. | Hours | Feed rate | Mid-reactor temp., °F. | Weight percent liquid in product |
| --- | --- | --- | --- | --- |
| 1 | 4 | 20.8 | 300 | 19.2 |
| 2 | 8 | 21.9 | 300 | 18.1 |
| 3 | 8 | 21.9 | 300 | 16.3 |
| 4 | 8 | 21.4 | 300–350 | 17.4 |
| 5 | 8 | 23.4 | 350 | 21.0 |
| 6 | 8 | 21.6 | 350 | 24.3 |
| 7 | 8 | 20.3 | 350 | 24.3 |
| 8 | 8 | 22.8 | 350 | 22.9 |
| 9 | 8 | 21.4 | 350 | 24.8 |
| 10 | 8 | 20.4 | 350–375 | 23.5 |

Table C

| Period No. | Hours | Feed rate | Mid-reactor temp., °F. | Weight percent liquid in product |
| --- | --- | --- | --- | --- |
| 1 | 8 | 20.9 | 350 | 25.4 |
| 2 | 8 | 19.2 | 350 | 27.2 |
| 3 | 8 | 19.7 | 350 | 26.0 |
| 4 | 8 | 20.0 | 350 | 28.3 |
| 5 | 8 | 19.0 | 350–360 | 27.8 |
| 6 | 8 | 20.6 | 360 | 24.0 |
| 7 | 8 | 20.3 | 360 | 25.3 |

The data given above under Table A illustrate the necessity for the extended induction period at elevated temperature when the catalytic material employed is not first subjected to the preliminary treatment in accordance with the present invention. In the particular operation represented by Table A it was necessary to pass the reaction gases over the catalytic material for a period of forty hours at and above the reaction temperature in order to initiate conversion of the olefins, and this induction period is representative of operations of the type of which Table A is an example. In the operation represented by Table B the catalytic material received a preliminary treatment with hydrogen at the reaction temperature and at a pressure of 1000 pounds per square inch for ten hours, after which the passage of the feed gases through the reactor was initiated. It will be noted that conversion of olefins to liquids at a rate comparable to that of Table A was obtained immediately. The same observations are true of Table C wherein the preliminary hydrogen treatment was carried out at 500° F. and atmospheric pressure.

The method of the present invention thus eliminates the necessity for the use of the olefin-rich feed gases during an extended induction period during which the production of polymers is substantially nil. The method described above is applicable to the use of a single body of catalytic material for olefin conversion, but it is particularly advantageous in connection with the use of a plurality of such bodies of catalytic material wherein one or more of such bodies are employed in the treatment of a continuous olefin-rich stream of hydrocarbons while one or more other bodies of catalytic material are prepared for use and activated by being subjected to reducing conditions in accordance with the present invention. It is contemplated that when a body of catalytic material is thus prepared for use by activation it will be put in the hydrocarbon stream in place of a similar body of catalytic material which has become reduced in activity. In this manner the present invention provides a method for continuous conversion treatment of an olefin-containing hydrocarbon mixture without the use of any of said olefin-containing hydrocarbon mixture for the activation of the catalytic material employed.

I claim:

1. In the treatment of an olefin-rich hydrocarbon mixture by contact of said mixture at elevated temperature with catalytic material containing as an essential ingredient a metal pyrophosphate capable of reduction to an active modification which is a polymerization catalyst, the steps comprising maintaining the said catalytic material in a reducing atmosphere other than said olefin-rich hydrocarbon mixture at elevated temperature for a time sufficient to effect reduction of a portion of the metal pyrophosphate to the active modification thereof and then initiating the passage thereover of said olefin-rich hydrocarbon mixture at elevated temperature not substantially greater than 600° F.

2. The method in accordance with claim 1 wherein said reducing atmosphere is substantially olefin free.

3. The method in accordance with claim 1 wherein said reducing atmosphere consists essentially of hydrogen.

4. The method in accordance with claim 1 wherein said reducing atmosphere is maintained substantially at the polymerizing temperature and pressure.

5. The method in accordance with claim 1 wherein said reducing atmosphere is maintained above the polymerizing temperature and substantially at atmospheric pressure.

6. The method in accordance with claim 1 wherein at least a portion of said metal pyrophosphate is stabilized by having associated therewith a double salt of said metal pyrophosphate and a soluble pyrophosphate whereby said stabilized metal pyrophosphate is less easily reduced than said metal pyrophosphate when free from said metal salt.

7. The method in accordance with claim 1 wherein copper pyrophosphate is employed as said metal pyrophosphate.

EDWIN T. LAYNG.